UNITED STATES PATENT OFFICE.

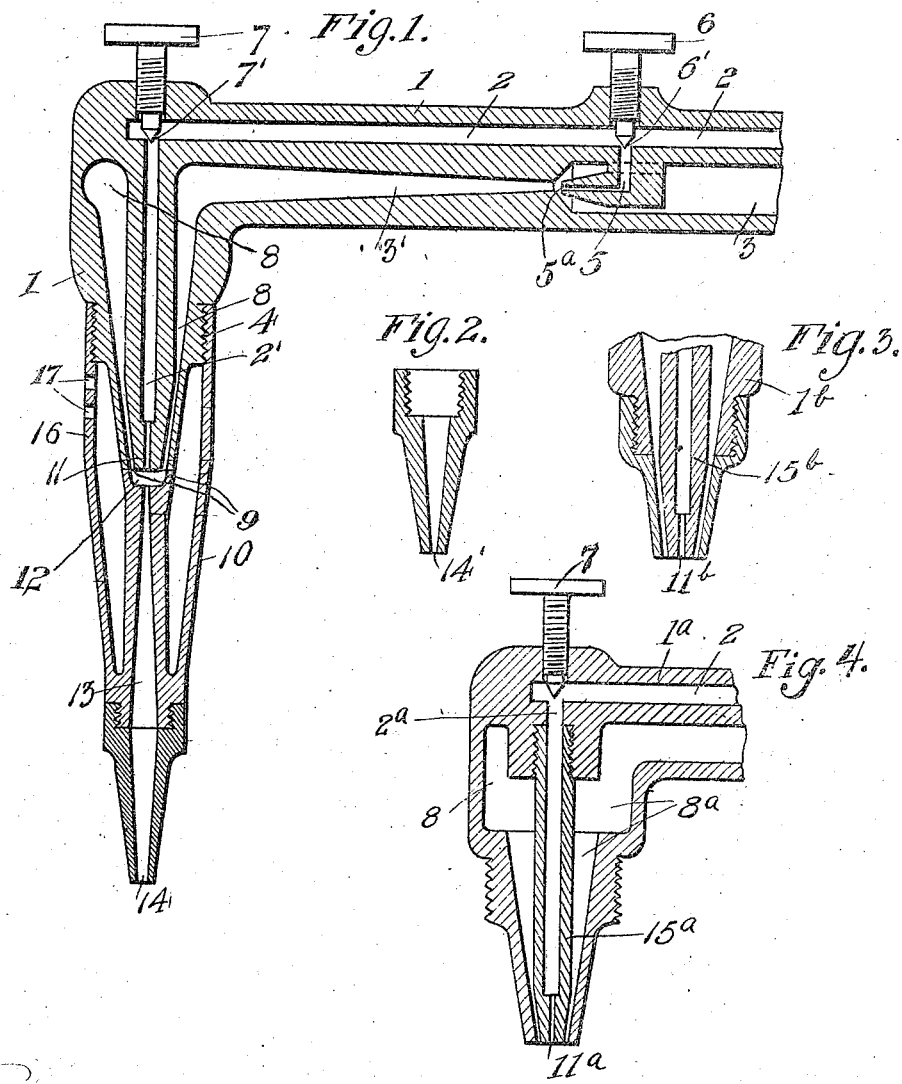

WILHELM BRANDES, OF GOTTENBORG, SWEDEN.

APPARATUS FOR AUTOGENOUS METAL-WORKING.

1,006,459.        Specification of Letters Patent.    Patented Oct. 24, 1911.

Application filed November 18, 1909. Serial No. 528,790.

*To all whom it may concern:*

Be it known that I, WILHELM BRANDES, a subject of the King of Sweden, and resident of Gottenborg, Sweden, have invented certain new and useful Improvements in Apparatuses for Autogenous Metal-Working, of which the following is a specification.

The invention relates to liquid and gaseous fuel burners, and especially to a combined blow pipe and mixing tube; and has for its several objects,—First, to provide a gas mixing and burning device, whereby the mixing of the gases may be so regulated and applied that the operations of metal welding and metal severing may be advantageously performed therewith. Second, to provide a device of the character stated, having interchangeable nozzles whereby various thicknesses of metal may be advantageously treated. Third, to provide means for attaching the nozzles whereby said means will not affect the flow of gas from the nozzles, and whereby the attaching means is not detrimentally affected by the heat from the nozzles. Fourth, to provide means in connection with the foregoing for preventing the conduction of excessive heat into the main body of the blow pipe. These objects are attained by the mechanism hereinafter described, reference being had to the accompanying drawings forming part of the application, and in which similar characters designate similar parts throughout the several views.

Figure 1 is a longitudinal sectional view of the body portion of the device, a portion at the right being broken off; Fig. 2 is a sectional view of an interchangeable nozzle. Figs. 3 and 4 are fragmental sections of modifications having other nozzles attached thereto.

This invention consists in a device, comprising a body portion 1, a feed duct for oxygen gas 2, and a second feed duct for proper combustible gas, which may be acetylene gas, or any of the gases well-known in the art. The ducts 2 and 3 are substantially parallel with each other. The duct 2' constitutes a branch of the oxygen gas duct 2, being substantially at right angles thereto, and communicating therewith through a valve 7' which is controllable by the screw 7 for interrupting said communication when desirable. The branch 2' is surrounded by an annular portion 8 of a mixing chamber and an annular nozzle 9, the said nozzle and chamber merging with each other. Said annular portion also merges with the elongated portion of the mixing chamber 3' which is contiguous to the duct 3. A branch 5 comprises a port perpendicular to the duct 2 and communicates therewith, extending in the direction of the combustible gas duct 3. Extending into the duct 3, is a nozzle portion 5ª at right angles to the said branch, being centrally alined with the duct 3.

It is known that severing metal with gas flame is accomplished most effectually when the oxygen gas and combustible gas are applied with force simultaneously and, unmixed to the surface to be severed, and thus burned on said surface. It is also known that welding metal with a gas flame is most effectually accomplished when the oxygen gas is intimately mixed with the combustible gas. In welding, it is also essential that the flame be relatively large and shall heat a relatively large surface, whereas in the operation of severing, the effective flames should be small, forceful and intensely hot. It is obvious, however, that when such a flame, as last described, is directed on a cold metallic body of considerable thickness, the heat conducting properties of said body will render the process tedious. If, however, a welding flame be first applied and the metal preheated and relatively softened thereby, the small intensely hot flame then forcefully applied, the metal will be easily pierced by the last said flame, and by a gradual movement thereof across the said body, the same may be slotted or severed. The two flames described, are provided by the present invention, and may be employed either separately or simultaneously as follows: If a welding flame is desired, the valve 7' is closed, the valve 6' is opened, by means of the screws 6, and the oxygen gas is admitted through the branch 5 and nozzle 5ª into the portion 3' of the mixing chamber. Oxygen gas from the nozzle 5ª enters an end of the duct 3 with considerable velocity and creates a draft which carries combustible gas therewith into the portion 3', where it is partially mixed with the combustible gas in the primary mixing chamber 3', and in the annular recess 8 from whence it makes exit through the annular combustion nozzle 9, where combustion takes effect.

In welding metals of different character and thickness, different degrees of temperature and different sizes of flame are employed, as provided for by the use of suitable and interchangeable nozzles. For example, if desired to admit relatively more of the oxygen gas, the valve 7' is opened and a mixing nozzle 10 is attached, whereupon oxygen gas is emitted through the port 11 and thence through the chambers 12 and 13 and the combustion nozzle 14, while simultaneously the intimately mixed gases from the secondary chamber 8 and nozzle 9 enter the chamber 12 and begin mixing with the said oxygen gas while entering expanded chamber 13, where the mixing is continued until said gases are finally consumed by the flame at the nozzle 14.

It is obvious that if a larger and less forceful flame is desired, the nozzle 14 may be removed, whereupon the mixing nozzle 10 constitutes a combustion nozzle; and if a smaller and more forceful flame is desired, a smaller interchangeable combustion nozzle as 14', Fig. 2, may be applied. It is also obvious that the relative proportions of gases may be regulated by adjustment of the valves 6' and 7'.

When it is desired to use this blow pipe for severing metal, the port 11 is preferably temporarily closed by means of the screw 7, and a flame is first employed, as for welding heretofore described, until the metal has become softened thereby; whereupon the valve 7' is opened and the pure oxygen gas is applied forcefully through the port 11, producing an intense and concentrated flame which pierces the metal, and whereby slotting or severing may be accomplished as heretofore described.

It is desirable, in severing and slotting, to vary the size of the flame according to the character and thickness of metals. Therefore interchangeable nozzles, as 15ª and 15ᵇ having ports 11ª, 11ᵇ of various sizes, may be fitted to the body member 1ª as shown in Fig. 4. It is evident that the construction of the device may be modified to conform with Fig. 3, and with various other modifications within the scope of the principles involved, whereby the relative sizes of the flames may be varied.

For prevention of excessive heat conduction through the nozzles to the body of the blow pipe, a water jacket 16, is provided, having apertures 17, for admission of water when the instrument is dipped into water for the purpose of filling said water jacket. These apertures also serve as steam vents.

I claim:

1. In a blow pipe, a body portion having an oxygen gas duct therein, a combustible gas duct substantially parallel with said oxygen gas duct, said oxygen gas duct having a branch extending toward the combustible gas duct, a nozzle on said branch communicating with said combustible gas duct, and a mixing chamber centrally alined with the combustible gas duct and communicating with the latter, said mixing chamber comprising an annular portion having an extension terminating in an annular nozzle, said oxygen gas duct having a branch at one end extending through said annular portion and communicating with a relatively small oxygen gas nozzle.

2. In a blow pipe, a body portion having an oxygen gas duct therein, a combustible gas duct substantially parallel with said oxygen gas duct, said oxygen gas duct having a branch extending toward the combustible gas duct, a nozzle on said branch centrally alined with and communicating with said combustible gas duct, and a mixing chamber centrally alined with the combustible gas duct and communicating with the latter, said mixing chamber comprising an annular portion having an extension terminating in an annular nozzle, said oxygen gas duct having a branch at one end extending through said annular portion and communicating with a relatively small oxygen gas nozzle.

3. In a blow pipe, a body portion having an oxygen gas duct therein, a combustible gas duct parallel with said oxygen gas duct, said oxygen gas duct having a branch extending toward the combustible gas duct, a nozzle on said branch communicating with said combustible gas duct, and a mixing chamber comprising an elongated portion and an annular portion, said elongated portion being centrally alined with the combustible gas duct and communicating with the latter, said annular portion of the mixing chamber having an extension at substantially right angles to the said elongated portion and terminating in an annular nozzle, said oxygen gas duct having a branch at one end extending through said annular portion and communicating with a relatively small oxygen gas nozzle.

4. In a blow pipe, a body portion having an oxygen gas duct therein, a combustible gas duct substantially parallel with said oxygen gas duct, said oxygen gas duct having a branch extending toward the combustible gas duct, a nozzle on said branch communicating with said combustible gas duct, and a mixing chamber centrally alined with the combustible gas duct and communicating with the latter, said mixing chamber comprising an annular portion having an extension out of alinement with said elongated portion and terminating in an annular nozzle, said oxygen gas duct having a branch at one end thereof extending through said annular portion and communicating with a relatively small oxygen gas nozzle.

5. In a blow pipe, a body portion having an oxygen gas duct therein, a combustible gas duct substantially parallel with said oxygen gas duct, said oxygen gas duct having a branch extending toward the combustible gas duct, a nozzle on said branch communicating with said combustible gas duct, a primary mixing chamber centrally alined with the combustible gas duct and communicating with the latter, said mixing chamber comprising an annular portion having an extension terminating in an annular nozzle, said oxygen gas duct having a branch at one end extending through said annular portion and communicating with a relatively small oxygen gas nozzle, and a secondary mixing chamber communicating with the annular nozzle and with the oxygen gas nozzle, said secondary mixing chamber communicating with a combustion nozzle.

6. In a blow pipe, a body portion having an oxygen gas duct therein, a combustible gas duct substantially parallel with said oxygen gas duct, said oxygen gas duct having a branch extending toward the combustible gas duct, a nozzle on said branch communicating with said combustible gas duct, a primary mixing chamber centrally alined with the combustible gas duct and communicating with the latter, said mixing chamber comprising an annular portion having an extension terminating in an annular nozzle, said oxygen gas duct having a branch at one end extending through said annular portion and communicating with a relatively small oxygen gas nozzle, and a secondary mixing chamber communicating with the annular nozzle and with the oxygen gas nozzle, said mixing chamber communicating with a combustion nozzle through an expanded chamber.

7. In a blow pipe, a body portion having an oxygen gas duct therein, a combustible gas duct substantially parallel with said oxygen gas duct, said oxygen gas duct having a branch extending toward the combustible gas duct, a nozzle on said branch communicating with said combustible gas duct, a primary mixing chamber centrally alined with the combustible gas duct and communicating with the latter, said mixing chamber comprising an annular portion having an extension terminating in an annular nozzle, said oxygen gas duct having a branch at one end extending through said annular portion and communicating with a relatively small oxygen gas nozzle, a secondary mixing chamber communicating with the annular nozzle and with the oxygen gas nozzle, said secondary mixing chamber communicating with a combustion nozzle, and a water jacket surrounding the annular nozzle.

In testimony whereof I have hereunto set my hand in presence of two witnesses.

WILHELM BRANDES.

Witnesses:
BENJ. BOTHMEX,
E. JOHNSON.